(12) United States Patent
Rines et al.

(10) Patent No.: US 6,352,389 B1
(45) Date of Patent: Mar. 5, 2002

(54) METHOD OF CONSTRUCTION, DEPLOYING AND OPERATING SUBMERSIBLE AND REFLOATABLE UNDERWATER TUBULAR PLATFORM STRUCTURES AND THE LIKE, AS FOR UNDERWATER ILLUMINATION AND TARGET DETECTION, AND IMPROVED UNDERWATER PLATFORM STRUCTURES THEREFOR

(75) Inventors: Justice C. Rines, Concord; Alexander H. Slocum, Bow, both of NH (US)

(73) Assignee: Academy of Applied Science ( * ) Notice: Subject to any disclaimer, the term of this patent is extended or adjusted under 35 U.S.C. 154(b) by 0 days.

(21) Appl. No.: 09/557,238

(22) Filed: Apr. 24, 2000

(51) Int. Cl.$^7$ .............................................. E02D 23/02
(52) U.S. Cl. ...................... 405/205; 405/203; 405/188; 405/185
(58) Field of Search ................................. 405/203, 204, 405/205, 206, 207, 208, 209, 195.1, 200, 196, 185, 188, 190, 191; 396/419, 420, 421, 422, 428

(56) References Cited

U.S. PATENT DOCUMENTS

| | | | | |
|---|---|---|---|---|
| 3,407,610 A | * | 10/1968 | Wolff | 405/205 |
| 3,589,133 A | * | 6/1971 | Lowd et al. | 405/204 |
| 4,696,602 A | * | 9/1987 | Daigle, Sr. et al. | 405/205 |
| 5,507,596 A | * | 4/1996 | Bostelman et al. | 405/188 |
| 5,636,943 A | * | 6/1997 | Haney | 405/203 |

* cited by examiner

*Primary Examiner*—David Bagnell
*Assistant Examiner*—Frederick L. Lagman
(74) *Attorney, Agent, or Firm*—Rines and Rines

(57) ABSTRACT

A novel automatically submersible and refloatable underwater tubular pipe platform geometric structure adapted for deployment in underwater target monitoring systems and the like, wherein the floating upon the surface of the water enables flooding of the pipe structure and its submergence, and the introduction of compressed air drives the water out of the pipe platform structure to enable its automatic re-floating.

25 Claims, 3 Drawing Sheets

METHOD OF CONSTRUCTION, DEPLOYING AND OPERATING SUBMERSIBLE AND REFLOATABLE UNDERWATER TUBULAR PLATFORM STRUCTURES AND THE LIKE, AS FOR UNDERWATER ILLUMINATION AND TARGET DETECTION, AND IMPROVED UNDERWATER PLATFORM STRUCTURES THEREFOR

FIELD

The present invention relates to the construction, deployment and operation of underwater platform structures and the like, as for enabling underwater illumination and/or target detection and the like, being more particularly directed to modular structures formed of hollow pipes or tubes interconnected into three-dimensional geometric structures capable of being submerged from the water surface by flooding, and deployed at predetermined underwater regions, as for supporting underwater camera, lighting and sensing equipments and the like, and of being recovered from the surface by refloating by compressed air or other gas without the need for a diver or recovery vehicle or lifting lines, as for the purpose of servicing on the surface, and then re-submerging by re-flooding for further underwater deployment.

BACKGROUND

A myriad of underwater platform structures and mounts have been employed over the years for positioning various types of equipments and personnel, generally requiring lines to the surface or lifting vehicles and the like and/or diver recovery.

In underwater camera, lighting and sonar monitoring in researches at the oceans and in lakes, as, for example, Loch Ness, Scotland, over the years, resort has been had to weighted frame structures lowered by ropes, lines, or chains from the surface and deployed from boats, rafts, tethers or buoys, and recovered by the lifting of lines, or, if the structure was released to the bottom, lifting by diver assistance. Such structures and deployment are described, for example, by Rines, Edgerton, Wyckoff, and Klein in the MIT Technology Review of March–April 1976, Vol. 78, No. 5, pp. 25–40, "Search for the Loch Ness Monster"; Institute of Electrical and Electronic. Engineers Spectrum, February 1978, page 229, "Loch Ness Revisited", Edgerton and Wyckoff; and in the National Geographic, June 1977.

For such and similar underwater research and activities, the frame not only supported the underwater camera equipment but also the underwater lights, generally beamed into the region directly in front of the camera lens; for example, strobe flash units secured to the side of the camera on the frame. Sonar transducers for obtaining sonar traces and/or triggering elapsed time strobe photography were also carried by the frame—the unit being submerged by lines from the surface.

More recently, following a recent further expedition if the Academy of Applied Science at Loch Ness reported by Nova-PBS in its January 1999 documentary, "The Beast of Loch Ness", researcher Charles Wyckoff found that the debilitating rapid attenuation and scatter of light directed out from the camera frame toward underwater targets and then again suffered on the return reflection to the camera, can be significantly obviated by mounting the lights considerably forward of the camera frame, directed somewhat forward and upward, providing an increased photographic range by impinging the light on the target closer to the target and avoiding the two-way scatter of common frame mounted cameras and lights.

This required the use of multiple equipment-mounting structures and the complexity of multiple sets of tethering lines and accompanying deployment headaches.

It was particularly to the solution of such additional complexities that the present invention was created, the desire being to create novel lightweight modular frames or platforms that could be floated into position, submerged and recovered independently and without lines or divers—a specification that has been realized with the novel construction of the present invention, admitting also of extreme ease of handling, equipment attachment, deployment, adjustment and adapted to cover zones of any desired extent or configuration.

This has been achieved through novel interconnected buoyant hollow tubes or pipes formed into a geometric structure—preferably a truncated tetrahedron, submersible by automatic flooding when placed on the surface of the water and with stability of orientation during submerging; and, when desired, refloatable by a compressed air hose attachment. The modular structure is particularly adapted through its tubular element construction to mount underwater reflector lamps, video and other camera tubes, cylindrical and other sonar transducers and other devices, and through use of simple clamps and strappings, permit of ready servicing and adjustment on the surface—and if a diver is available, on the bottom or in the mid-column, as well. The flooding inlets, moreover, also can serve as legs for stabilizing position on the bottom, and the modular platforms are readily distributed over any desired zone, at different regions or locations in front of and to the side of the camera platform, with easy light-weight adjustment, (again underwater by a diver if available), creating near, mid-and far zones of distant lighting zones on either side of the center line of the camera platform, overlapping and illuminating both near and far areas—and including adding the facility for distant silhouette imaging, as well.

OBJECTS OF INVENTION

A primary object of the invention, accordingly, is to provide a new and improved method of constructing, deploying and operating novel submersible and refloatable modular underwater tubular platform structures for the above and related purposes that obviates the above-described and other limitations and problems with prior art frames, and platforms and their deployment.

A further object is to provide such a novel modular platform structure that is particularly designed for deployment in numbers and patterns that enable wide underwater zone lighting remote from monitoring camera structures and that is especially suited for systems employing underwater target-detection sensing and automatic triggering of such lighting zones in response thereto.

Other and further objects will be explained hereinafter and are more particularly defined in the appended claims.

SUMMARY

In summary, however, from one of its viewpoints, the invention embraces a method of providing and deploying one or more submersible and re-floatable underwater platforms, for supporting one or more underwater light, camera and underwater target or other sensing equipments, that comprises, interconnecting hollow sections of buoyant pipes in a geometric structure to form each platform, and with each structure having water-floodable sections and intermediate baffle sections symmetrically positioned in the structure; providing for each platform structure, water inlets at the bottom of the structure for admitting water into the floodable sections as the platform is placed on the surface of the water, thereby to cause the structure to become heavier than the water and to submerge at a desired underwater region, steadied during submerging by flow control at the baffle sections, providing for each structure a compressed air or other gas inlet near the top of the structure for enabling the connection thereto of a compressed air or other gas hose; and, when it is desired to recover the submerged platform(s), as for servicing and re-deploying of the equipments, introducing the compressed air or other gas through the hose inlet and into the flooded sections to force the water therein out of said water inlets, gradually restoring the buoyancy of the structure and permitting its re-floating to the surface.

As another feature, the invention includes a submersible and refloatable underwater support platform, having, in combination, interconnected hollow sections of buoyant pipes formed into a geometric structure having water floodable sections and intermediate baffle sections symmetrically positioned in the structure; water inlets provided at the bottom of the structure for admitting water into the floodable sections as the platform is placed on the surface of the water, thereby to cause the structure to become heavier than the water and to submerge, steadied during the submerging by the flow control by the baffle sections; a compressed air or other gas inlet provided near the top of the structure for enabling the connection thereto of a compressed air or other gas hose; and means operable when it is desired to recover the submerged platform 1, compressed air or other gas may be introduced through the hose inlet and into the water-flooded platform sections to drive the water therein out of said water inlets, gradually restoring the buoyancy of the structure and permitting its rise and refloating to the surface, again as steadied by the flow control of the baffle sections; and wherein one or more of underwater light, camera and underwater target sensor equipment is externally attached and oriented at predetermined regions of the pipe structure before submerging; the same being serviceable at the surface upon refloating.

Preferred and best mode designs, configurations and deployment arrangements are later detailed.

DRAWINGS

The invention will now be described in connection with the accompanying drawings in which FIG. 1 is an isometric view of a platform constructed in accordance with the invention, FIG. 2 is a view of the platform of FIG. 1, floating on the surface before submerging;

PREFERRED EMBODIMENT(S) OF INVENTION

Figure 1:
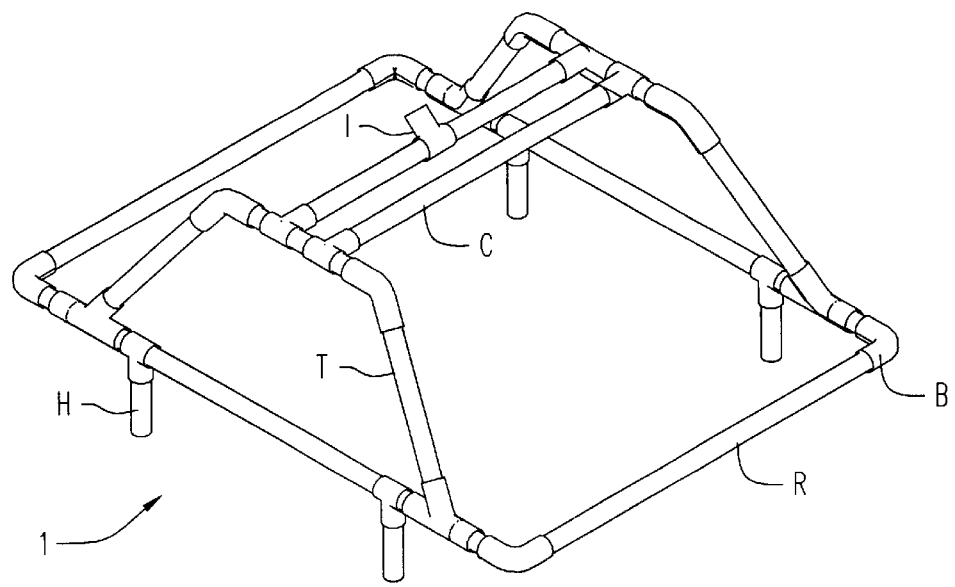

FIG. 1 illustrates a preferred tubular platform construction embodying the principles of the invention and particularly suitable for the underwater monitoring purposes herein described.

Figure 2:
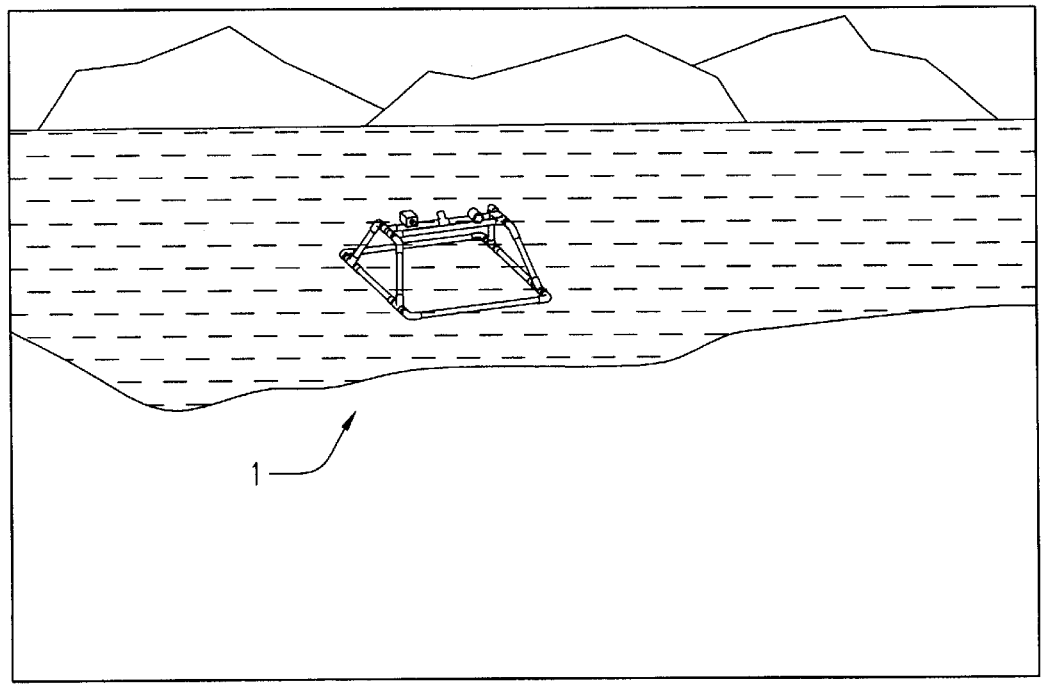

A submersible and refloatable underwater support platform is shown at 1, constructed of interconnected hollow sections of buoyant pipes, such as polyvinyl chloride pipes, formed into a geometric structure; in this instance, a preferred truncated tetrahedron, and having water floodable sections symmetrically positioned in the structure comprising a rectangular horizontal-plane base frame pipe section R, from the opposite lateral sides of which trapezoidal side pipe frame sections T extend, upwardly diverging and connected at their tops by a pair of parallel horizontal cross support pipes C. Water inlets are provided, shown in the form of hollow depending legs H, at the bottom of the platform structure 1 for admitting water into the floodable sections R-T-C as the platform is placed on the surface of the water, as in FIG. 2. This flooding causes the structure 1 to become heavier than the water and gradually to submerge. Baffles are preferably inserted in the pipes at symmetrical points B, FIG. 1, adjacent one side of the base frame connection to each leg H to steady the flooding during the submerging by the flow control effected around the baffle sections.

Figure 3:
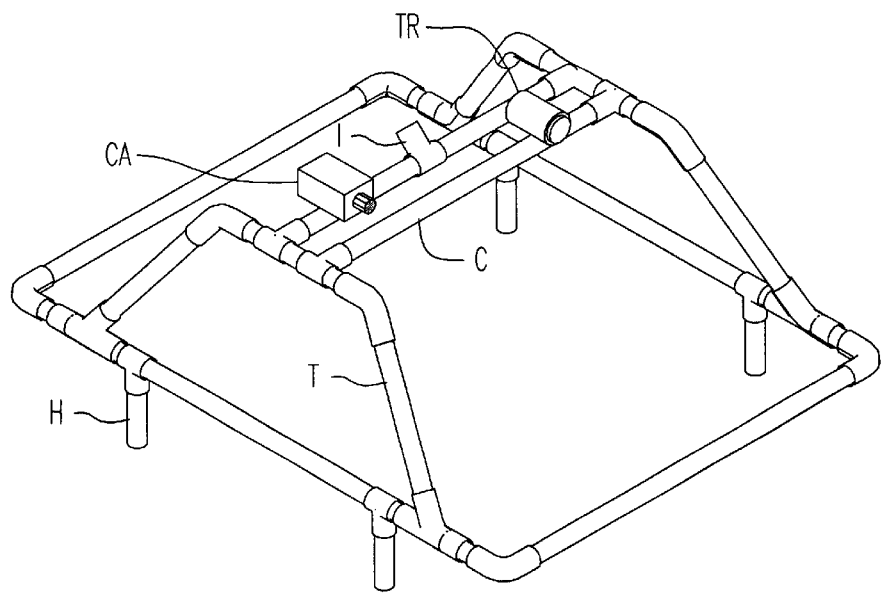
FIG. 3 shows the mounting of video camera and sonar sensing transducer elements on a platform.

A compressed air or other gas inlet I is shown provided in FIGS. 1 and 3, near the top of the structure in one of the cross-support pipes C for enabling the connection thereto of a compressed air or other gas hose.

Figure 4:
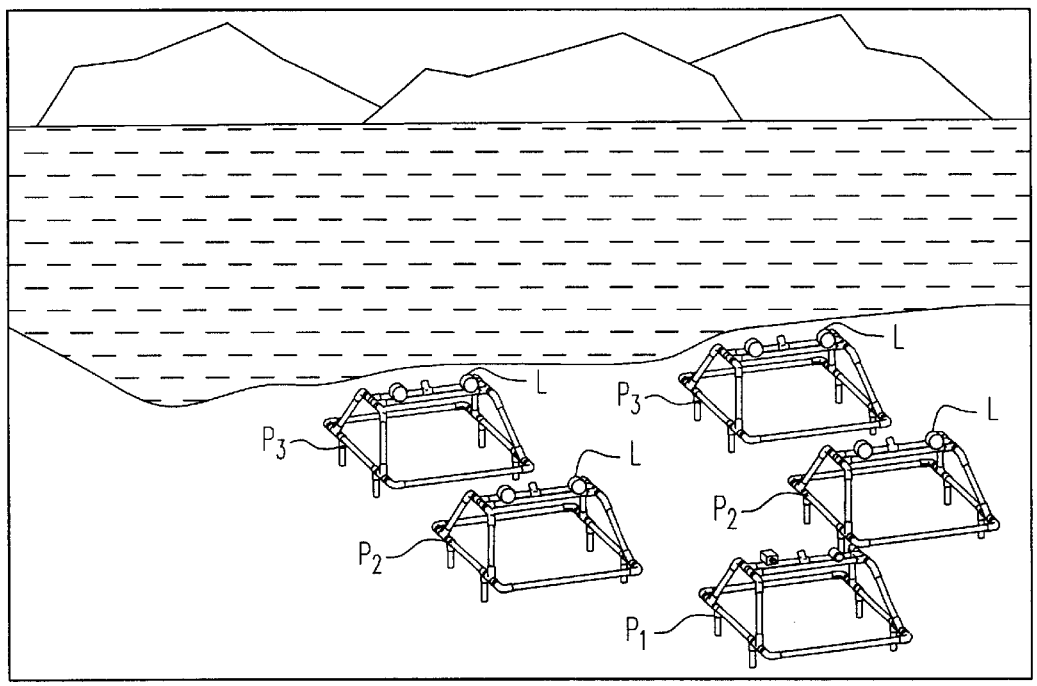
FIG. 4 is a view of the camera platform of FIG. 3 and four underwater light platforms ready for deployment.
Figure 5:
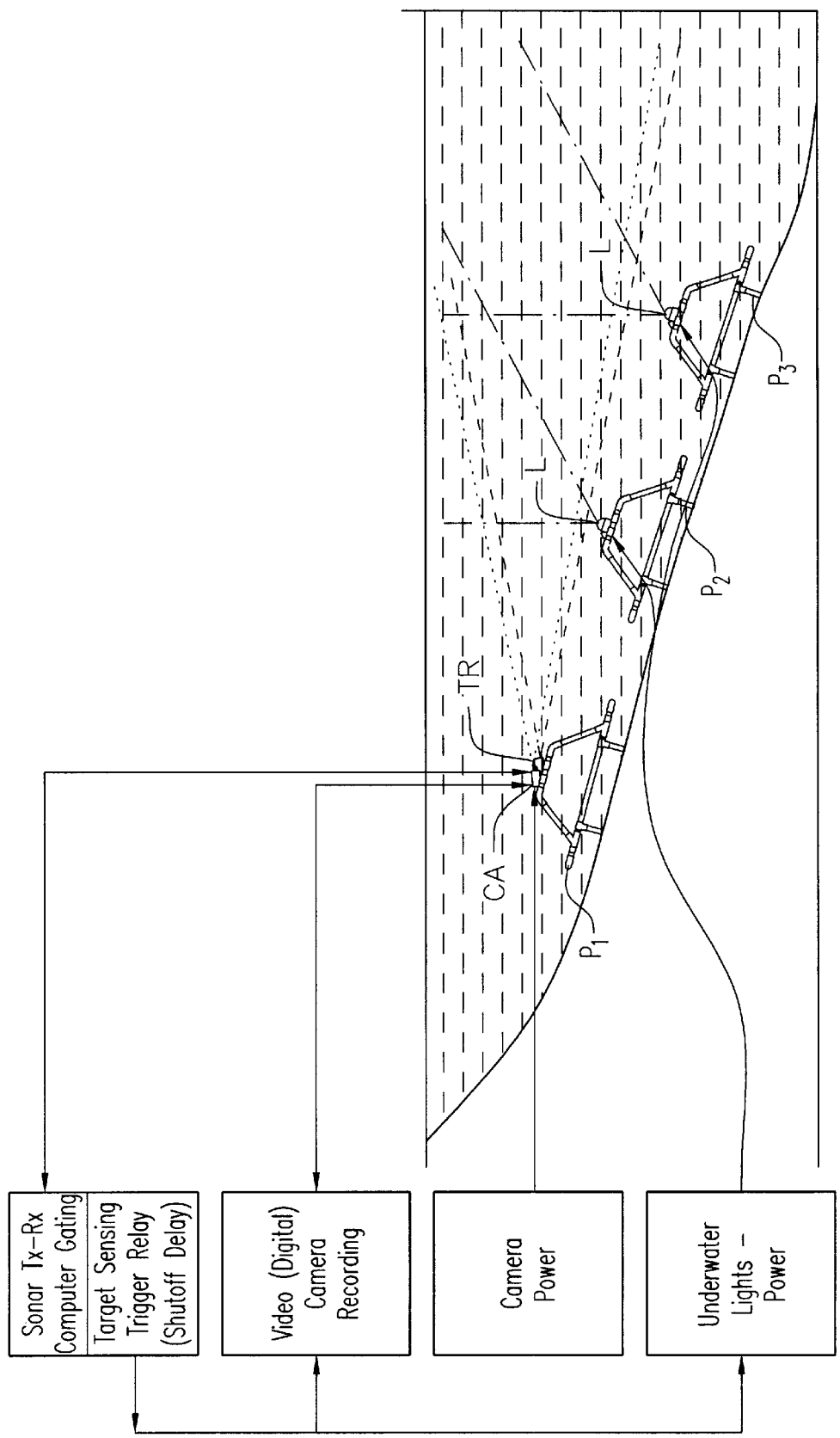
FIG. 5 is a deployment and block circuit power and signal diagram for a platform installation designed for underwater monitoring and recording of targets passing in the region of the platforms.

The use of circular cross-section pipe sections makes very convenient the attachment of accessories to be mounted and oriented and adjusted on the platform, such as the before-discussed underwater cameras, sonar or other sensing transducers, underwater lights, etc. Thus, in FIG. 3, the mounting of an underwater video monitoring camera by a bracket plant to the cross-brace pipes C is shown at CA, and the strapping of a cylindrical sonar transducer around an upper corner of the side frame T is shown at TR, This camera-sonar sensor platform is shown in FIGS. 4 and 5 at $P_1$, to be deployed underwater at a relatively shallower depth on an incline slope (FIG. 5) than pairs of deeper high-intensity spot or flood light platforms $P_2$ and $P_3$ arrange. for deployment in FIG. 4 and illustrated deployed in FIG. 5. The flood lights, such as high wattage halogen lights are shown flexibly mounted to the platform cross frames at L in FIG. 5.

This configuration is currently being used by the Academy of Applied Science at Loch Ness, Scotland to learn more about the ecology, fish spawning and plankton and other life on a continuing year-round basis. In the configuration shown in FIG. 5, the underwater video camera CA supported on the platform as in FIG. 3, is continually powered from the shore as is the sonar equipment, so-labeled, causing the transducer TR continuously to send a sound beam (dashed lines), adjusted to be substantially co-extensive with and overlapping the region of the camera field of view (dotted lines), to explore targets intruding into the region above and forward of the platforms $P_2$, $P_3$, the lights L of which are normally quiescent. In this mode, the camera is continuously monitoring whatever might be visible in the dark water without the aid of the lights L. When the sonar receiver Rx indicates the presence of a target, of pre-determined distance and size ranges as adjusted by a computer gating system, as of the type described in U.S. Pat. Nos. 4,105,990, 4,335,944 and 4,447, 896 of said Academy, a trigger signal is produced that operates a trigger relay (so-labeled) to convert the underwater light shore-based power source to illuminate the sets of platforms lights L which, as shown, are preferably adjusted to provide upward and forward overlapping beams pointed away from the camera, as indicated by the dash-dot cone lines. This enables remote illumination of the targets avoiding the scatter and attenuation of two-way light propagation earlier discussed, enabling greater light detection range in the inhospitable dark, light-absorbing scattering water of the Loch, and also enabling silhouette imaging. The lights L used in this deployment are Deep Sea Power & Lighting San Diego 250 Watt halogen lamps, and the video camera, Benthos CDTV low light level camera.

Variations in geometric platform design and deployment will occur to those skilled in the art, and such are considered to fall within the spirit and scope of the invention as defined in the appended claims.

What is claimed is:

1. A method of providing and deploying one or more submersible and re-floatable underwater platforms, for supporting one or more underwater light, camera and underwater target or other sensing equipments, that comprises, interconnecting hollow sections of buoyant pipes in a geometric structure to form each platform, and with each structure having water-floodable sections and intermediate baffle sections symmetrically positioned in the structure; providing for each platform structure water inlets at the bottom of the structure for admitting water into the floodable sections as the platform is placed on the surface of the water, thereby to cause the structure to become heavier than the water and to submerge at a desired underwater region, steadied during submerging by flow control by the baffle sections; providing for each structure a compressed air or other gas inlet near the top of the structure for enabling the connection thereto of a compressed air or other gas hose; and, when it is desired to recover the submerged platform(s), as for servicing and re-deploying of the equipments, introducing the compressed air or other gas through the hose inlet and into the flooded sections to force the water therein out of said water inlets, gradually restoring the buoyancy of the structure and permitting its re-floating to the surface.

2. A method of providing submersible and floatable underwater support platforms, that comprises, interconnecting hollow sections of buoyant pipes into a geometric structure having water floodable sections and intermediate baffle sections symmetrically positioned in the structure, providing water inlets at the bottom of the structure for admitting water into the floodable sections as the platform is placed on the surface of the water, thereby to cause the structure to become heavier than the water and to submerge, steadied during submerging by flow control by the baffle sections; and providing a compressed air or other gas inlet near the top of the structure for enabling the connection thereto of a compressed air or other gas hose; and, when it is desired to recover the submerged platform, introducing the compressed air or other gas through the hose inlet and into the flooded sections to force the water therein out of said water inlets, gradually restoring the buoyancy of the structure and permitting its re-floating to the surface.

3. The method claimed in claim 2 wherein the further step is performed of connecting the hose to a compressed air or other gas source above the surface of the water to enable both submerging and re-floating from the surface.

4. The method claimed in claim 2 wherein the material forming the hollow pipes is selected to have a density less than that of the water.

5. The method claimed in claim 4 wherein the pipe material is polyvinyl chloride.

6. The method claimed in claim 2 wherein the geometric structure comprises a truncated tetrahedron.

7. The method claimed in claim 2 wherein one or more of underwater light, camera and underwater target and other sensor equipment is externally attached and oriented at predetermined regions of the pipe structure before submerging, and is serviced upon re-floating.

8. The method of claim 7 wherein an underwater camera is attached to the platform before submerging; and one or more similar platforms carrying underwater lights are submerged forward of the camera platforms to illuminate underwater zones in front of the camera.

9. The method of claim 8 wherein the camera platform is submerged at an upper region of a downwardly inclining underwater slope, and the cane or more similar light platforms are submerged at regions lower down the slope in front of and below the camera platform.

10. The method of claim 9 wherein the lights carried by the one or more light platforms are directed upwards of the submerged platforms and overlappingly from their respective submerged regions to create the illuminated zones.

11. The method of claim 9 wherein the camera platform also carries a sonar target detecting sensor, with the camera angles of field of view adjusted to overlie the angles of the sonar beam and extending over the regions of the light platforms.

12. The method of claim 11 wherein, upon the sensing of a target in the sonar beam, the lights on the light platforms are triggered on to enable recording by the camera of the detected target in the illuminated zones.

13. The method of claim 12 wherein, for purposes of servicing and adjustment, each of the camera and light platforms are re-floated and then re-submerged in their respective positions on the inclined underwater slope.

14. The method of claim 13 wherein the camera is a video camera and recording is effected at a surface location.

15. The method of claim 14 wherein the recording is one or both of analog VCR tape recording and digital computer storage with internet and modem relaying capability.

16. A submersible and refloatable underwater support platform, having, in combination, interconnected hollow sections of buoyant pipes formed into a geometric structure having water floodable sections and intermediate baffle sections symmetrically positioned in the structure; water inlets provided at the bottom of the structure for admitting water into the floodable sections as the platform is placed on the surface of the water, thereby to cause the structure to become heavier than the water and to submerge, steadied during the submerging by the flow control by the baffle sections, a compressed air or other gas inlet provided near the top of the structure for enabling the connection thereto of a compressed air or other gas hose; and means operable when it is desired to recover the submerged platform, for introducing compressed air or other gas through the hose inlet and into the water-flooded platform sections to drive the water therein out of said water inlets, gradually restoring the buoyancy of the structure and permitting its rise and re-floating to the surface, again as steadied by the flow control of the baffle sections.

17. The apparatus of claim 16 wherein one or more of underwater light, camera and underwater target sensor equipment is externally attached and oriented at predetermined regions of the pipe structure before submerging, the same being serviceable at the surface upon re-floating.

18. The apparatus of claim 17 wherein an underwater camera is attached to the platform before submerging; and one or more similar platforms carrying underwater lights are submerged forward of the camera platforms to illuminate underwater zones in front of the camera.

19. The apparatus of claim 18 wherein the camera platform is submerged at an upper region of a downwardly inclining underwater slope, and the one or more similar light platforms are submerged at regions lower down the slope in front of and below the camera platform.

20. The apparatus of claim 19 wherein the lights carried by the one or more light platforms are directed upwards of the submerged platforms and overlappingly from their respective submerged regions to create the illuminated zones.

21. The apparatus of claim 20 wherein the camera platform also carries a sonar target detecting sensor, with the camera angles of field of view adjusted to overlie the angles of the sonar beam and extending over the regions of the light platforms.

22. The apparatus of claim 21 wherein means is provided operable upon the sensing of a target in the sonar beam, to trigger on the lights on the light platforms to enable recording by the camera of the target in the illuminated zones.

23. The apparatus of claim 22 wherein the camera is a video camera and the recording is effected at a surface location.

24. The apparatus of claim 23 wherein the recording is effected by one or both of analog VCR tape recording and digital computer storage with internet and modem relaying capability.

25. The apparatus of claim 24 wherein means is provided for turning on the underwater lights and the recording in response to the detection by the sonar of a target entering the zone above the light platforms.

* * * * *